US009648525B2

(12) United States Patent
Ponukumati et al.

(10) Patent No.: US 9,648,525 B2
(45) Date of Patent: May 9, 2017

(54) SYSTEM AND METHODS FOR IMPROVING INTRA-FREQUENCY CELL RESELECTION ON A WIRELESS COMMUNICATION DEVICE IN CONNECTED MODE

(71) Applicant: QUALCOMM Incorporated, San Diego, CA (US)

(72) Inventors: Dhananjaya Sarma Ponukumati, Hyderabad (IN); Rammohan Kandlakunta, Hyderbad (IN); Mohit Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/505,071

(22) Filed: Oct. 2, 2014

(65) Prior Publication Data

US 2016/0050590 A1    Feb. 18, 2016

Related U.S. Application Data

(60) Provisional application No. 62/036,135, filed on Aug. 12, 2014.

(51) Int. Cl.
*H04W 36/00* (2009.01)
*H04B 17/309* (2015.01)
(Continued)

(52) U.S. Cl.
CPC ...... *H04W 36/0061* (2013.01); *H04B 17/309* (2015.01); *H04W 48/16* (2013.01);
(Continued)

(58) Field of Classification Search
CPC . H04W 48/20; H04W 24/10; H04W 36/0061; H04W 36/0072; H04W 36/0083;
(Continued)

(56) References Cited

U.S. PATENT DOCUMENTS 8,112,102 B2    2/2012  Fischer
8,588,773 B2   11/2013  Deshpande et al.
(Continued)

FOREIGN PATENT DOCUMENTS

EP    2302971 A2    3/2011
EP    2427028 A1    3/2012
(Continued)

OTHER PUBLICATIONS

3GPP: "Universal Mobile Telecommunications System (UMTS): Requirements for support of radio resource management (FDD) (3GPP TS 25.133 version 7.9.0 Release 7); ETSI TS 125 133", Internet Citation, Sep. 1, 2007, pp. 1-185, XP002507853.
(Continued)

*Primary Examiner* — Kathy Wang-Hurst
*Assistant Examiner* — B. M. M Hannan
(74) *Attorney, Agent, or Firm* — The Marbury Law Group, PLLC

(57) ABSTRACT

Methods and devices for enabling improved cell reselection procedures on a wireless communication device with a first SIM is camped on a serving cell of a first network may include receiving a list of neighbor cells from system information that is broadcast in the serving cell, and performing signal measurements associated with the listed neighbor cells and the serving cell, and, based on the signal measurements, identifying neighbor cells that satisfy selection criteria. The wireless device may calculate ranking criteria for the serving cell and the identified neighbor cells, and determine whether an inter-frequency neighbor cell has a highest ranking criteria among all of the ranked cells. Upon determining that an intra-frequency neighbor cell has the highest ranking criteria, the wireless device may start a reselection timer and also start decoding the system infor-
(Continued)

mation that is being broadcast in the intra-frequency neighbor cell that has the highest ranking criteria.

28 Claims, 7 Drawing Sheets

(51) Int. Cl.
| | | |
|---|---|---|
| *H04W 48/16* | (2009.01) | |
| *H04W 8/18* | (2009.01) | |
| *H04W 48/20* | (2009.01) | |

(52) U.S. Cl.
CPC ........ *H04W 8/183* (2013.01); *H04W 36/0083* (2013.01); *H04W 48/20* (2013.01)

(58) Field of Classification Search
CPC ..... H04W 36/30; H04W 48/08; H04W 48/12; H04W 48/16; H04W 48/18; H04W 88/06; H04W 60/00; H04W 36/14; H04W 36/18; H04W 36/08; H04W 36/32; H04J 11/0093; H04B 7/022; Y02B 60/50
USPC .... 455/436, 434, 435.3, 437, 438, 442, 458, 455/466, 435.2, 525; 370/328, 331, 329, 370/338
See application file for complete search history.

(56) References Cited

U.S. PATENT DOCUMENTS

| | | | |
|---|---|---|---|
| 8,600,388 B2 | 12/2013 | Magadi Rangaiah et al. | |
| 8,706,115 B2 | 4/2014 | Pani et al. | |
| 9,042,883 B2 * | 5/2015 | Wang .................. | H04J 11/0093 455/432.1 |
| 2006/0040700 A1* | 2/2006 | Roberts ................ | H04W 36/14 455/525 |
| 2008/0188266 A1* | 8/2008 | Carter .................. | H04W 16/10 455/561 |
| 2009/0247161 A1 | 10/2009 | Pani et al. | |
| 2010/0027510 A1* | 2/2010 | Balasubramanian . | H04W 48/18 370/332 |
| 2010/0093356 A1 | 4/2010 | Lee et al. | |
| 2011/0021201 A1 | 1/2011 | Lee et al. | |
| 2012/0106683 A1* | 5/2012 | Zhao .................. | H03M 13/2957 375/341 |
| 2012/0122460 A1* | 5/2012 | Dalsgaard ......... | H04W 36/0061 455/444 |
| 2012/0135731 A1* | 5/2012 | Rangaiah .............. | H04W 48/20 455/434 |
| 2013/0079003 A1* | 3/2013 | Nagaraja ............... | H04W 24/02 455/435.1 |
| 2013/0109394 A1 | 5/2013 | Rangaiah et al. | |
| 2013/0225169 A1 | 8/2013 | Farnsworth et al. | |
| 2014/0092873 A1* | 4/2014 | Hamilton .......... | H04W 36/0094 370/332 |
| 2014/0106750 A1* | 4/2014 | Roullier ................ | H04W 48/20 455/436 |
| 2014/0128074 A1* | 5/2014 | Vangala ................ | H04W 36/22 455/436 |
| 2014/0220981 A1* | 8/2014 | Jheng .................. | H04W 76/045 455/437 |
| 2014/0321343 A1* | 10/2014 | Gupta ............... | H04W 36/0066 370/311 |
| 2015/0003311 A1* | 1/2015 | Feuersaenger .... | H04W 52/0225 370/311 |

FOREIGN PATENT DOCUMENTS

| | | |
|---|---|---|
| EP | 2458920 A1 | 5/2012 |
| EP | 2590446 A1 | 5/2013 |

OTHER PUBLICATIONS

3rd Generation Partnership Project, Technical Specification Group Radio Access Network, User Equipment (UE) Procedures in Idle Mode and Procedures for Cell Reselection in Connected Mode (Release 12), 3GPP Standard, 3GPP TS 25.304, 3rd Generation Partnership Project (3GPP), Mobile Competence Centre ; 650, Route Des Lucioles, F-06921 Sophia-Antipolis Cedex , France, vol. RAN WG2, No. V12.2.0, Jul. 4, 2014, pp. 1-56, XP050774618, [retrieved on Jul. 4, 2014] sections 5.2.6.1.1, 5.2.6.1.4.
International Search Report and Written Opinion—PCT/US2015/042064—ISA/EPO—Nov. 4, 2015.

* cited by examiner

SYSTEM AND METHODS FOR IMPROVING INTRA-FREQUENCY CELL RESELECTION ON A WIRELESS COMMUNICATION DEVICE IN CONNECTED MODE

RELATED APPLICATIONS

This application claims the benefit of priority to U.S. Provisional Application No. 62/036,135 entitled "System and Methods for Improving Intra-frequency Cell Reselection on a Wireless Communication Device in Connected Mode" filed Aug. 12, 2014, the entire contents of which are hereby incorporated by reference.

BACKGROUND

In a typical cellular radio system, a wireless communication device may communicate via a radio access network (RAN) to a core network. The wireless communication device may be any of a number of device types, such as a mobile telephone (also known as cellular or cell phones), laptop with wireless communication capability, personal digital assistant (PDA), etc. These may be portable, hand held, pocket sized, installed in a vehicle etc and communicate voice and/or data signals with the radio access network.

In a Universal Mobile Telecommunications System (UMTS) network, a wireless device may perform cell reselection upon determining that reselection criteria are fulfilled (e.g., a higher ranked neighbor cell is found based on various ranking criteria calculated using measurements and parameters from system information). Once the better neighbor cell is identified, the cell reselection procedure may involve starting a reselection timer that is configured to introduce hysteresis in the time domain (i.e., a delay). If the reselection criteria are still present once the reselection timer expires, the wireless device may perform reselection by decoding system information blocks (SIBs) of the indentified better neighbor cell, followed by a cell update procedure to update the controlling radio network controller (RNC).

Sources of delay in the typical cell reselection procedure may be the hysteresis delay and time that it takes to decode the SIBs of the better neighbor cell after cell reselection timer expires. When the serving cell is performing poorly, if the device is in a radio resource control (RRC) connected mode, the decoding/reading of the SIBs and cell update procedure may significantly degrade the data rate. In certain existing single-SIM devices, such delay may be mitigated by setting the reselection timer to zero, thereby causing decoding of SIBs and cell reselection immediately after better a neighbor cell is identified. However, since tune-away is not allowed during cell reselection, dual-SIM (e.g., DSDS) devices may experience decreased performance on a second SIM due to decoding SIBs for a first SIM after expiration of the reselection timer.

SUMMARY

Systems, methods, and devices of various embodiments enable a wireless communication device having at least a first SIM associated with a radio frequency resource and a first modem stack, in which the first modem stack is operating in a radio resource control (RRC) connected modem, to improve cell reselection. Such improvements in cell reselection may be accomplished by implementing an embodiment method that includes detecting that the first modem stack is camped on a serving cell of a first network, receiving a list of neighbor cells from system information broadcast in the serving cell, performing signal measurements associated with the neighbor cells and the serving cell, identifying neighbor cells that satisfy selection criteria based on the signal measurements, calculating ranking criteria for the serving cell and the identified neighbor cells, determining whether an intra-frequency neighbor cell has a highest ranking criteria among the identified neighbor cells and the serving cell, and starting a reselection timer with a non-zero duration and decoding system information broadcast by intra-frequency neighbor cell in response to determining that the intra-frequency neighbor cell has a highest ranking criteria among the identified neighbor cells and the serving cell. Embodiment methods may also include determining whether the reselection timer has expired, recalculating the ranking criteria for the serving cell and for the identified neighbor cells in response to determining that the reselection timer has expired, and determining whether the recalculated ranking criteria for the intra-frequency neighbor cell has a highest value among the identified neighbor cells and the serving cell. Embodiment methods may also include completing reselection to the intra-frequency neighbor cell in response to determining that the intra-frequency neighbor cell still has the highest ranking criteria among the identified neighbor cells and the serving cell.

Embodiment methods may also include determining whether the first modem stack is in an RRC state in which the RF resource is being used to monitor a downlink channel of the serving cell. In some embodiments, the decoding of the system information broadcast by the intra-frequency neighbor cell may be performed concurrently with monitoring the downlink channel of the serving cell. In some embodiments, determining whether the first modem stack is in an RRC state in which the RF resource is being used to monitor a downlink channel of the serving cell may include determining whether the first modem stack is in a CELL_FACH state.

Further embodiments include a wireless communication device having at least a first SIM associated with a radio frequency resource, a first modem stack and a processor coupled to the first SIM and the first modem stack and configured with processor-executable instructions to perform the embodiment methods described above. Further embodiments include a wireless communication device having at least a first SIM associated with a radio frequency resource, a first modem stack and means for performing functions of the embodiment methods described above. Further embodiments include a non-transitory processor-readable storage medium having stored thereon processor-executable instructions configured to cause a processor of a wireless communication device to perform the embodiment methods described above.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
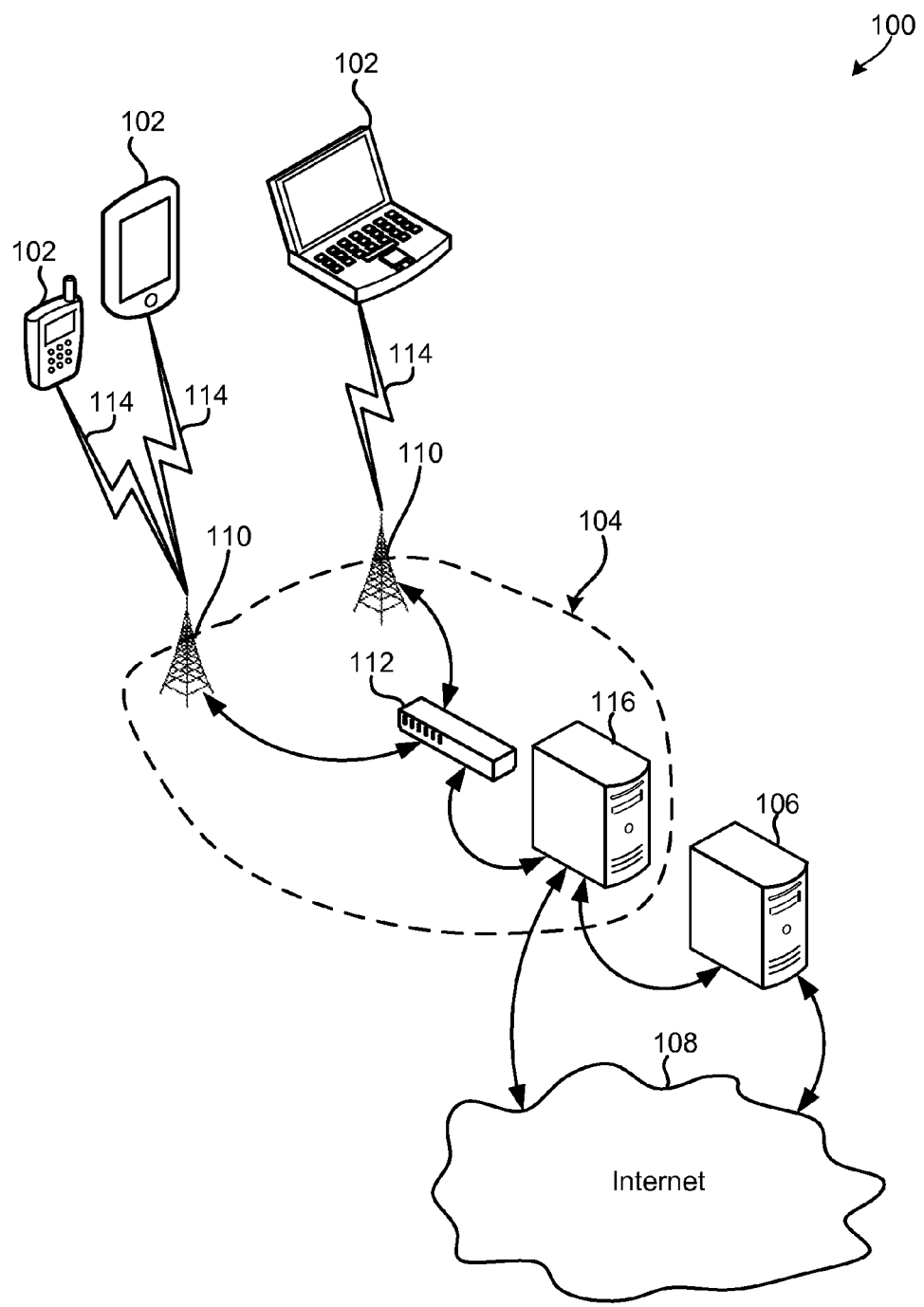
FIG. 1 is a communication system block diagram of a network suitable for use with various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments enable cell reselection for intra-frequency neighbor cells to be improved on a wireless communication device in a RRC connected mode by concurrently decoding system information blocks (SIBs) for a better intra-frequency neighbor cell while still monitoring a downlink channel (i.e., the FACH on the S-CCPCH) of the serving cell. In particular, in the various embodiments, instead of decoding SIBs upon expiration of the reselection timer, the wireless device, or a modem stack associated with a SIM of the wireless device, may immediately read the SIBs for that intra-frequency neighbor cell once the reselection timer begins. Once the reselection timer (which has a non-zero duration) expires, if the cell reselection criteria are still fulfilled by the intra-frequency neighbor cell, the wireless device may immediately reselect the neighbor cell by performing a cell update without requiring any additional time for reading the SIBs. In other words, reselection of the intra-frequency neighbor cell may be accomplished immediately in response to the reselection timer expiring without delays associated with reading the SIBs. Since the reselection timer must be greater than zero in order for multi-SIM wireless communication devices to function properly, and typically one or more seconds, the various embodiments enable a multi-SIM wireless communication device to achieve intra-frequency neighbor cell reselection than is possible in conventional devices.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "subscription," "SIM," "SIM card," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless device on a network. The terms subscription and SIM may also be used as shorthand reference to a communication network associated with a particular SIM, since the information stored in a SIM enables the wireless device to establish a communication link with a particular network, thus the SIM and the communication network, as well as the services and subscriptions supported by that network, correlate to one another.

As used herein, the terms "multi-SIM wireless communication device," "multi-SIM wireless device," "dual-SIM wireless communication device," "dual-SIM dual-standby device," and "DSDS device" are used interchangeably to describe a wireless device that is configured with more than one SIM and allows idle-mode operations to be performed on two networks simultaneously, a well as selective communication on one network while performing idle-mode operations on the other network.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a wireless communication device may have multiple subscriptions to one or more networks (e.g., by employing multiple subscriber identity module (SIM) cards or otherwise). Such a wireless device may include, but is not limited to, a dual-SIM, dual standby (DSDS) device. For example, a first subscription may be a first technology standard, such as Wideband Code Division Multiple Access (WCDMA), while a second subscription may support the same technology standard or a second technology standard, such as Global System for Mobile Communications (GSM) Enhanced Data rates for GSM Evolution (EDGE) (also referred to as GERAN).

A multi-SIM wireless device that supports two or more SIM cards may have a number of capabilities that provide convenience to a user, such as allowing different wireless carriers, plans, telephone numbers, billing accounts, etc. on one device. Developments in multi-SIM wireless communication device technology have led to a variety of different options for such devices. For example, an "active dual-SIM" wireless device allows two SIMs to remain active and accessible to the device. In particular, a type of active dual-SIM wireless communication device may be a "dual-active dual standby" (DSDS) wireless device in which two SIMs are configured to share a single transceiver (i.e., RF resource).

In operation, once powered on and/or recovering from an out-of-service condition, a conventional wireless device (or modem stack associated with a SIM of a conventional multi-SIM wireless device) may begin an initial cell selection procedure if no information about the current wireless environment is stored in the wireless device. Otherwise, the wireless device typically starts a cell selection using a stored information cell-selection procedure. The wireless device may have stored the necessary information of the cell (such as frequency and scrambling code) when the wireless device was previously camped on the cell. Generally, the wireless device may first try to synchronize with that previous cell, and if synchronization fails, the wireless communication device may trigger the initial cell selection.

A conventional wireless device may first attempt to find PLMNs for one or more radio access technology (e.g., UMTS). To find PLMNs, the wireless device may perform a power scan on enabled frequency bands supported by the radio access technology to indentify channels and measure signal strength for identified channels. The wireless device may identify those channels that are above a threshold signal strength and may attempt acquisition of each identified strong channel. Acquisition of a UMTS channel may involve detecting a carrier frequency by searching for a primary synchronization code (PSC) sequence sent on a primary synchronization channel (SCH) for an identified strong channel, such as by correlating received samples with a locally generated PSC sequence at different time offsets. Alternatively, the wireless device may use a list of stored carrier frequency information from previously received measurement and control information. In UMTS systems, such information includes scrambling code.

For each detected carrier frequency (i.e., acquired cell), the wireless device typically tunes to the frequency to read information to identify the associated network. For example, in UMTS systems, the wireless device typically correlates the signal of the detected carrier frequency (i.e., acquired cell) to possible secondary synchronization codes to determine the correct code and obtain the frame synchronization on the corresponding secondary synchronization channel (S-SCH) and group identity, finds the correct scrambling code, and detects the common control physical channel (CCPCH), which carries the system information including PLMN. In this manner, the wireless device may identify acquired cells in the wireless device's vicinity.

A conventional wireless device may select one of the PLMNs from those identified according to either automatic mode or a manual mode. Once a PLMN has been selected, the wireless device may read system information of each acquired cell to obtain parameters, for example, the PLMN identity and cell selection parameters. The wireless device may use such information to select one of the cells that belongs to the selected PLMN. While camped on a given cell, the wireless device may monitor signals from neighbor cells as well as current conditions in the serving cell for performing cell reselection.

Various embodiments may be implemented within a variety of communication systems, such as the example communication system 100 illustrated in FIG. 1. The communication system 100 may include one or more wireless devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 includes a plurality of cell base stations 110 coupled to a network operations center 112, which operates to connect voice and data calls between wireless devices 102 (e.g., tablets, laptops, cellular phones, etc.) and other network destinations, such as via telephone land lines (e.g., a POTS network, not shown) and the Internet 108. The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

Figure 2:
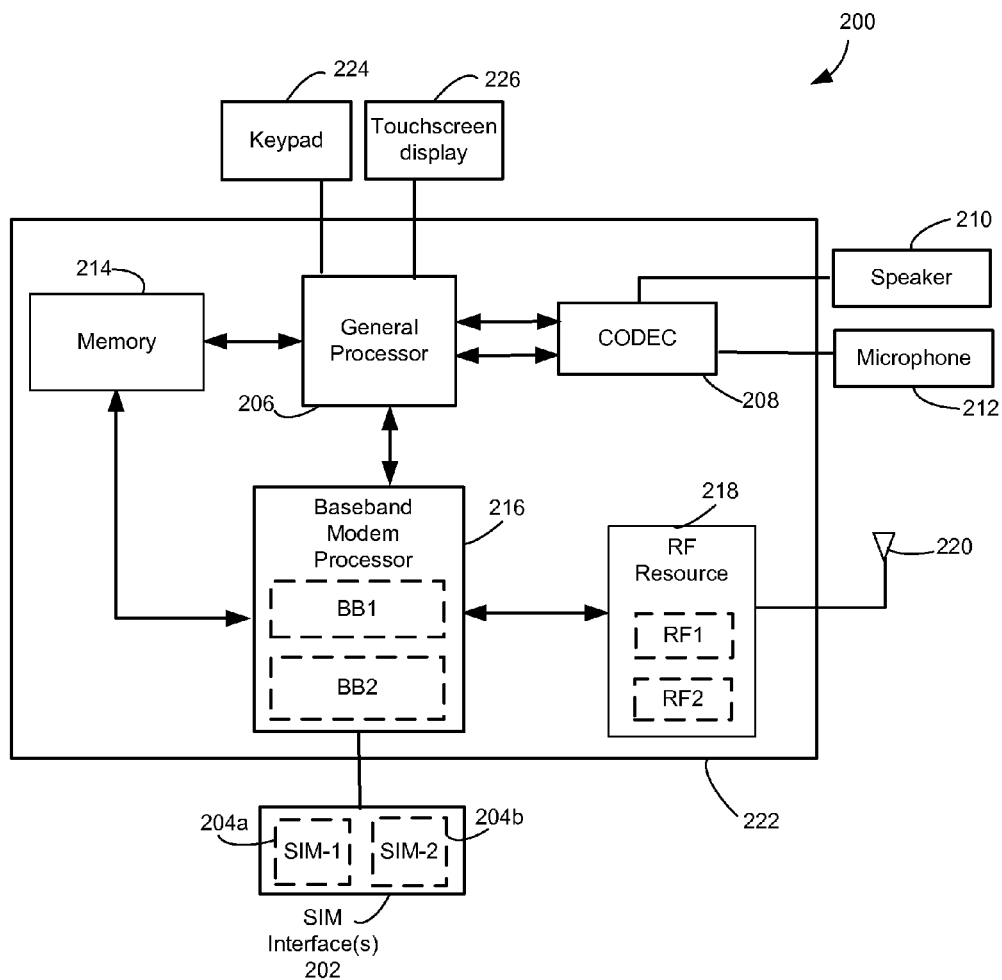
FIG. 2 is a block diagram illustrating a wireless communications device according to various embodiments.

FIG. 2 is a functional block diagram of an example wireless communication device 200 that is suitable for implementing various embodiments. According to various embodiments, the wireless device 200 may be similar to one or more of the wireless devices 102 described with reference to FIG. 1. With reference to FIGS. 1-2, in various embodiments, the wireless device 200 may be a single-SIM device, or a multi-SIM device, such as a dual-SIM device. In an example, the wireless device 200 may be a dual-SIM dual active (DSDA) device or a dual-SIM dual standby (DSDS) device. The wireless device 200 may include at least one SIM interface 202, which may receive a first identity module SIM (SIM-1) 204a that is associated with a first subscription. In some embodiments, the at least one SIM interface 202 may be implemented as multiple SIM interfaces 202, which may receive at least a second identity module SIM (SIM-2) 204b that is associated with at least a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204a, 204b may have a CPU, ROM, RAM, EEPROM and I/O circuits. One or more of the SIMs 204a, 204b used in various embodiments may contain user account information, an IMSI a set of SIM application toolkit (SAT) commands and storage space for phone book contacts. One or more of the SIMs 204a, 204b may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) SIM serial number may be printed on one or more SIM 204 for identification.

The wireless device 200 may include at least one controller, such as a general-purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

The general purpose processor 206 and memory 214 may each be coupled to at least one baseband modem processor 216. Each SIM 204 in the wireless device 200 may be associated with a baseband-RF resource chain that includes a baseband modem processor 216 and a radio resource/RF resource 218. In some embodiments, the wireless device 200 may be a DSDS device and both SIMs 204a, 204b may share a single baseband-RF resource chain. For example, such shared baseband-RF resource chain may include the baseband modem processor 216 and RF resource 218. In other embodiments, the wireless device 200 may be a single-SIM device or a DSDA device, with each SIM interface 202 and/or SIM 204 associated with a separate baseband-RF resource chain. For example, such separate baseband RF resource chains may each include separate baseband modem processor 216 functionality (e.g., BB1 and BB2) and RF resource 218 functionality (e.g., RF1 and RF2). The RF resource(s) 218 may be coupled to at least one antenna 220, and may perform transmit/receive functions for the wireless services associated with each SIM 204 of the wireless device 200. The RF resource(s) 218 may provide separate transmit and receive functionality, or may include a transceiver that combines transmitter and receiver functions.

In particular embodiments, the general purpose processor 206, memory 214, baseband modem processor(s) 216, and RF resource(s) 218 may be included in a system-on-chip device 222. The first and second SIMs 204a, 204b and their corresponding interface(s) 202 may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

For a subscription configured to connect to a WCDMA/UMTS network, the wireless communication device 200 may read system information from the broadcast channel (BCH) in order to perform any of a number of procedures, including a cell selection or reselection, a manual PLMN search, a transition from CELL_DCH to CELL_FACH or CELL_PCH state, etc. System information in WCDMA/UMTS systems may be organized into system information blocks (SIBs), each of which may have different characteristics, such as repetition rate and the instructions for the wireless communication device to reread the SIB. In some systems (e.g., UMTS), the system information messages that may be sent include SIB1, SIB2, SIB3 . . . to SIB18.

For clarity, while the techniques and embodiments described herein relate to a wireless device configured with at least one WCDMA/UMTS subscription, the embodiment techniques may be extended to subscriptions on other radio access networks (e.g., cdma2000, GSM, EVDO, LTE, etc.).

Scheduling information for SIBs for a particular WCDMA/UMTS cell may be provided by the network in a Master Information Block (MIB). The MIB and SIBs may be transmitted in a set of information messages over the primary common control physical channel (P-CCPCH). In particular, every 20 ms, a BCH transport block containing a system information message may be broadcast using P-CCPCH frames. The system information message may encapsulate segments of the MIB and and/or SIBs, as well as a system frame number (SFN) that counts P-CCPCH radio frames.

A conventional wireless communication device in a UMTS Terrestrial Radio Access Network (UTRAN) may be in either an RRC idle mode or an RRC connected mode. When in the connected mode, the wireless device may transition between various radio resource control (RRC) sub-states, including the CELL_FACH. Downlink communication in the CELL_FACH state may be through a forward access channel mapped to a secondary common control physical channel (S-CCPCH). In CELL_FACH, the wireless device may continuously monitors the FACH by reading the S-CCPCH in order to receive broadcast system messages and user data addressed to the device.

In various embodiments, in a UMTS system, the CELL_FACH may be well-suited for signaling traffic (for example, the transmission of CELL/URA UPDATE messages) and for applications requiring low uplink throughput. In some systems, uplink communication in the CELL_FACH state may be achieved through a random access transport channel (RACH) mapped to a packet random access channel (PRACH) physical channel. System information during CELL_FACH may be from a broadcast channel (BCH), as discussed, which may provide the setup details for the uplink RACH, the downlink FACH and High Speed Downlink Shared Channel (HS-DSCH) channels to be used in CELL_FACH.

In various systems, mobility may be handled autonomously by the wireless device in CELL_FACH state such that the wireless device may independently takes measurements and determine which cell to camp on.

In CELL_FACH, when a typical wireless device is camped in a cell, the wireless device regularly searches for a better cell according to a set of criteria that is broadcast in system information blocks. Such criteria may include selection criteria and ranking criteria, which may require various measurements of the serving and neighbor cell signals defined in system information (e.g., SIB11) of the serving cell. The selection and ranking criteria may also require various selection and ranking parameters, respectively, which may be provided in SIBs broadcast by the serving cell in order to perform measurements for reselection to a neighbor cell. The neighbor cells, which may include cells in the same frequency, other frequencies, and other Radio Access Technology (RATs), may be identified in a neighbor cell list.

The neighbor cell list may be sent, for example, in system information blocks (SIBs) of the serving cell, for example, in SIB11. The listed neighbor cells may use the same or a different radio access technology (RAT) as that of the serving cell. For example, a neighbor cell list may contain up to 32 GSM cells and up to 64 WCDMA neighbor cells distributed across up to three WCDMA frequencies. For the GSM cells, the neighbor cell list contains the ARFCN of the BCCH carrier and the BSIC. For cells using other technologies, such as WCDMA, additional information (e.g., a primary scrambling code) may be included in order to enable the device to determine quality of the cell.

The signal measurements taken by the wireless device may include the received signal code power (RSCP) and the pilot channel power to total power (Ec/Io) of the Common Pilot Channel (CPICH). In order to perform reselection of a neighbor cell, selection criteria that must be met may be that the cell selection quality value (Squal) is greater than zero, and the cell selection receive level value (Srxlev) is greater than zero. The calculation of the cell selection quality value may be:

Squal=measured CPICH Ec/Io−Qqualmin, where Qqualmin is the minimum required signal quality for the neighbor cell.

The calculation of the minimum required receive level value may be:

Srxlev=Measured CPICH RSCP−$Q_{rxlev}$min−max(TXPWR_MAX_RACH−P_MAX,0), where Qrxlevmin is the minimum required receive level in the neighbor cell, TXPWR_MAX_RACH is the maximum transmit power level that a device may use when accessing the neighbor cell on the uplink RACH, and P_MAX denotes the maximum output power of the wireless device. In various systems, the selection parameters of Qqualmin, Qrxlevmin, and TXPWR_MAX_RACH may be discovered from various system information broadcast by the serving cell (e.g., SIB3 and/or SIB4 for parameters of the serving cell, SIB11/12 for parameters of neighbor cells).

Once measurements on neighbor cells have been taken, the serving cell and the neighbor cells for which the selection criteria are satisfied may be ranked according to the ranking criteria, which may be a ranking for the serving cell (Rs) and a ranking for each neighbor cell that satisfies the selection criteria (Rn). The serving cell ranking may be calculated as:

Rs=Qmeas,s+Qhyst,s, where Qmeas,s is a quality value (i.e., CPICH Ec/No or CPICH RSCP) of the signal received from the serving cell, and Qhyst,s is a Hysteresis value for the serving cell.

For a particular neighbor cell, the neighbor cell ranking may be calculated as:

Rn=Qmeas,n−Qoffset s,n, where Qmeas,n is the quality value (i.e., CPICH Ec/No or CPICH RSCP) of the signal received from the neighbor cell, and Qoffset s,n is the offset between the quality measurements of the serving cell and neighbor cell (i.e., between Qmeas,s and Qmeas,n).

Using these ranking criteria defined above, the serving cell and neighbor cells that satisfy the selection criteria may be ranked by the wireless communication device. When a better cell is found according to the ranking criteria, the wireless communication device may perform cell reselection. That is, if a neighbor cell is ranked as the best cell, the wireless communication device may reselect to the neighbor cell if the neighbor remains ranked better than the serving cell during a certain time interval of Treselection. Treselection is a non-zero timer value that may be broadcast in SIB3/4, and is an integer value that typically ranges from 0.5-31 seconds in multi-SIM wireless communication devices. In some embodiments, the parameters for the ranking criteria (namely Qhyst and Treselection) may be common to all states (e.g., IDLE, CELL_FACH, CELL/URA_PCH), or they can be specifically tailored for FACH and PCH, which are denoted by FACH and PCH subscripts (Treselection_PCH & Treselection_FACH).

For example when particular neighbor cell begins to rank as the best cell according to the reselection criteria, the reselection timer may be started to countdown the non-zero Treselection time. If the reselection timer expires (i.e., duration of non-zero Treselection has passed) while that particular neighbor cell is still ranked as the best cell, the wireless device may perform cell reselection procedures to camp on that neighbor cell as a new cell.

If, prior to the expiration of the reselection timer, a second neighbor cell becomes the best (i.e., highest ranked) cell, a new reselection timer with the duration of non-zero Treselection may be set for the second neighbor cell. Similar to the first timer, if the new resection timer expires while the second neighbor cell is still ranked as the best cell, the wireless device may perform cell reselection procedures to camp on the second neighbor cell. Further, the current reselection timer may be stopped if the serving cell becomes the best (i.e., highest ranked) cell prior to the expiration of the reselection timer.

Therefore, the non-zero Treselection time provides some hysteresis in the time domain in order to ensure that a higher ranked neighbor cell actually provides better service. That is, the wireless device is prevented from making poor reselection decisions is response to large signal fluctuations, for example, due to high mobility of the wireless device. In combination with the Qhyst,s parameter, the non-zero Treselection time controls the trade-off between cell quality and standby time for the wireless device.

The operation of Treselection is provided in 3GPP TS 25.304v10.4.0 "User Equipment (UE) procedures in Idle mode and procedures for cell reselection in connected mode (Release 10)", 2011-06, the details of which are incorporated by reference herein.

Cell reselection procedures following expiration of the reselection timer typically include, for example, receiving and decoding the SIBs broadcast by the new cell, followed by a cell update. For an inter-frequency or inter-RAT reselection, receiving the new SIBs requires tuning to a new frequency. However, even in an intra-frequency reselection, the decoding of the new cell SIBs may be time consuming, which may significantly degrade the achieved data rate. Setting the Treselection time to zero in order to eliminate the delay in starting cell reselection is not workable in certain types of wireless communication devices, particularly in multi-SIM devices. For example, a DSDS device engaged in an active communication session on a first SIM typically performs idle mode processes (e.g., monitoring for paging indicators/messages, cell measurements, etc.) on a second SIM by brief periods of tune-away of the shared RF resource. However, during the process of reselecting to a new cell on the first SIM, such tune-away operations are not permitted. Therefore, setting a Treselection time to zero on a multi-SIM wireless communication device may degrade performance of the second SIM because the decoding of the new SIBs on the first SIM that happens immediately when Treselection is zero impacts the ability of the second SIM to receive pages or perform tasks.

The various embodiments avoid the delays from reading/decoding the new cell SIBs upon expiration of the Treselection timer by advancing the reselection process if the new cell is an intra-frequency cell. Specifically, the various embodiments may concurrently decode SIBs of an intra-frequency neighbor cell while reading the S-CCPCH of the serving cell, and without waiting for the expiration of the cell reselection timer. Upon expiration of the resection timer (i.e., after Treselection time passes), if the intra-frequency neighbor cell is still ranked as the best cell, the device may immediately (or, if Treselection is less than the time taken to decode the SIBs, upon finishing SIB decode) complete reselection to the new neighbor cell by performing the cell update.

Figure 3A:
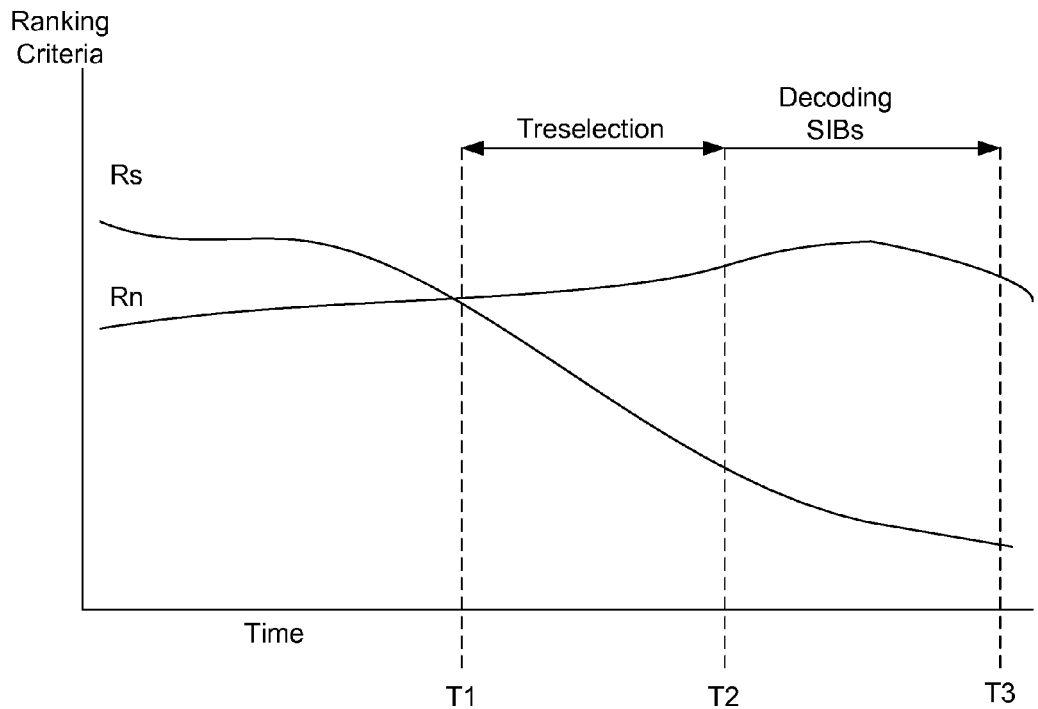
FIGS. 3A and 3B illustrate representative ranking criteria that compare cell reselection according to a conventional timeline to cell reselection according to various embodiments.
Figure 3B:
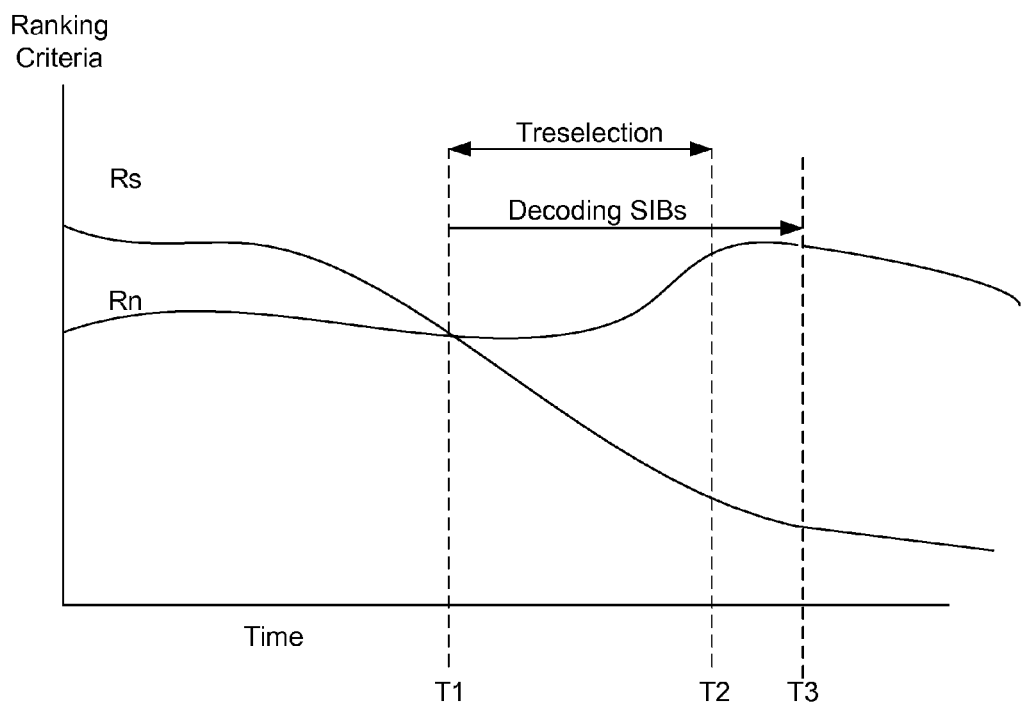

FIGS. 3A and 3B show example reselection timelines showing the effect of the various embodiments on cell reselection time compared to a conventional cell reselection. These examples illustrate ranking criteria calculations for the serving cell (Rs) as adjusted up by Qhyst,s, and the ranking criteria calculations for an intra-frequency neighbor cell (Rn) as adjusted down by Qoffset s,n. In FIG. 3A, showing a conventional reselection timeline, at time T1, the Rn value may surpass the Rs value, and the reselection timer may be started to count down a Treselection time. At time T2, the reselection timer expires while the Rn value is still higher than the Rs value. As a result, at time T2 the wireless device may begin to decode SIBs being broadcast by the intra-frequency neighbor cell, such as those required for camping on the cell. At time T3, the wireless communication device may finish decoding the SIBs and complete reselection by performing a cell update.

FIG. 3B shows a reselection timeline according to various embodiments. Similar to FIG. 3A, at time T1, the Rn value may surpass the Rs value, and the reselection timer may be started to count down a Treselection time. However, in this timeline at time T1, the wireless device may also begin to decode SIBs being broadcast by the intra-frequency neighbor cell. At time T2, the reselection timer expires while the Rn value is still higher than the Rs value. At time T3, the wireless communication device may finish decoding the SIB and may complete reselection by performing a cell update. Depending on the Treselection value set, in some embodiments the time T2 may occur after time T3, in which case completion of the reselection by cell update may be performed upon reaching time T2.

As illustrated in FIG. 3B, the various embodiments may avoid the additional time typically required to decode SIBs to perform reselection. In this manner, the wireless communication device may minimize the time hysteresis, regardless of whether the device is a single or multi-SIM device. Further, since the wireless communication device may already by utilizing the RF resource continuously in CELL_FACH state (e.g., by continuously reading the S-CCPCH), the battery life of the device may not be impacted by decoding the SIBs upon the start of the reselection timer.

Although described below with reference to UMTS-type and GSM-type communication layers, the modem stacks in various embodiments may support any of a variety of standards and protocols for wireless communications.

Figure 4A:
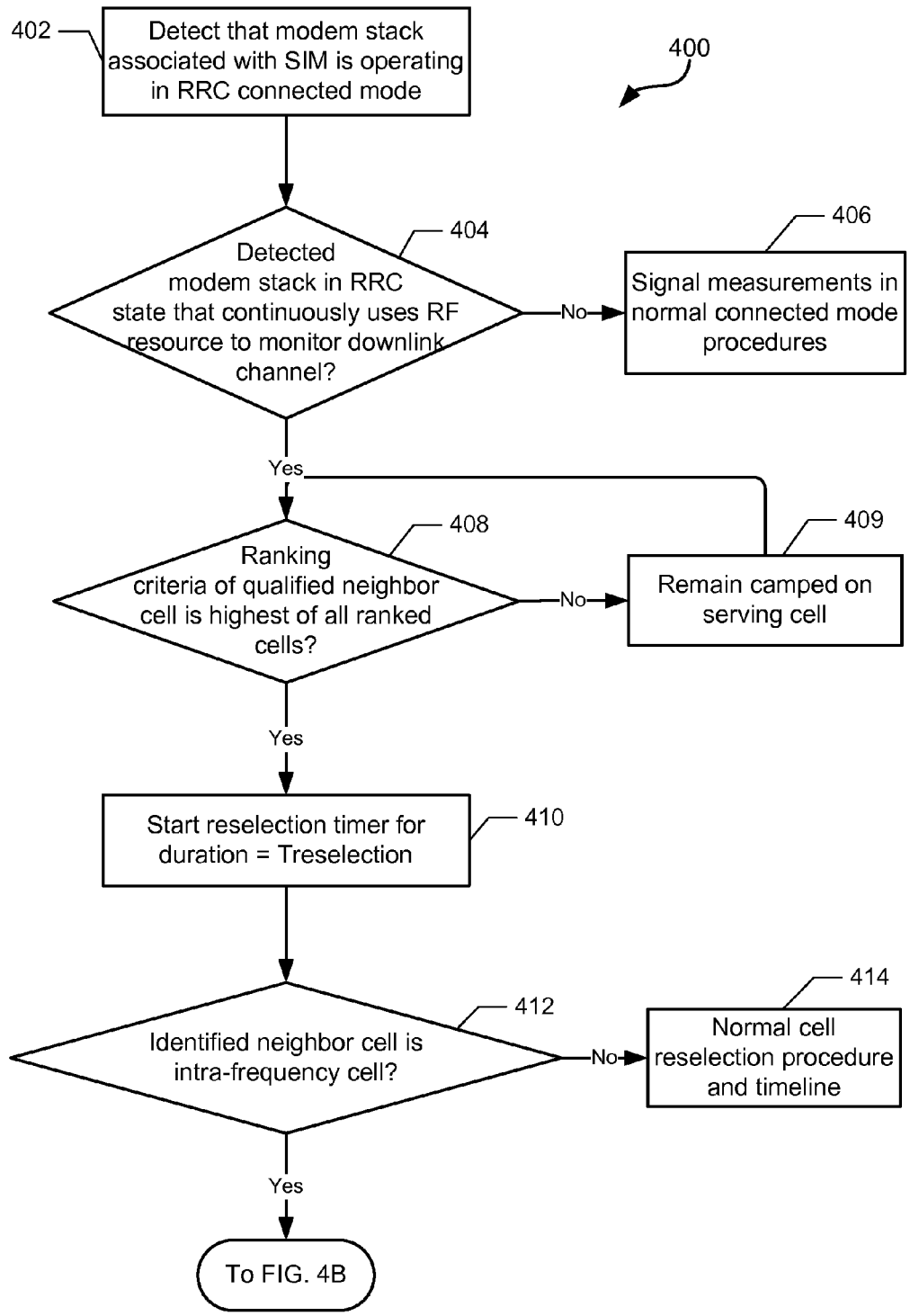
FIGS. 4A and 4B are process flow diagrams illustrating a method for improving intra-frequency cell reselection for a wireless communication device according to various embodiments.
Figure 4B:
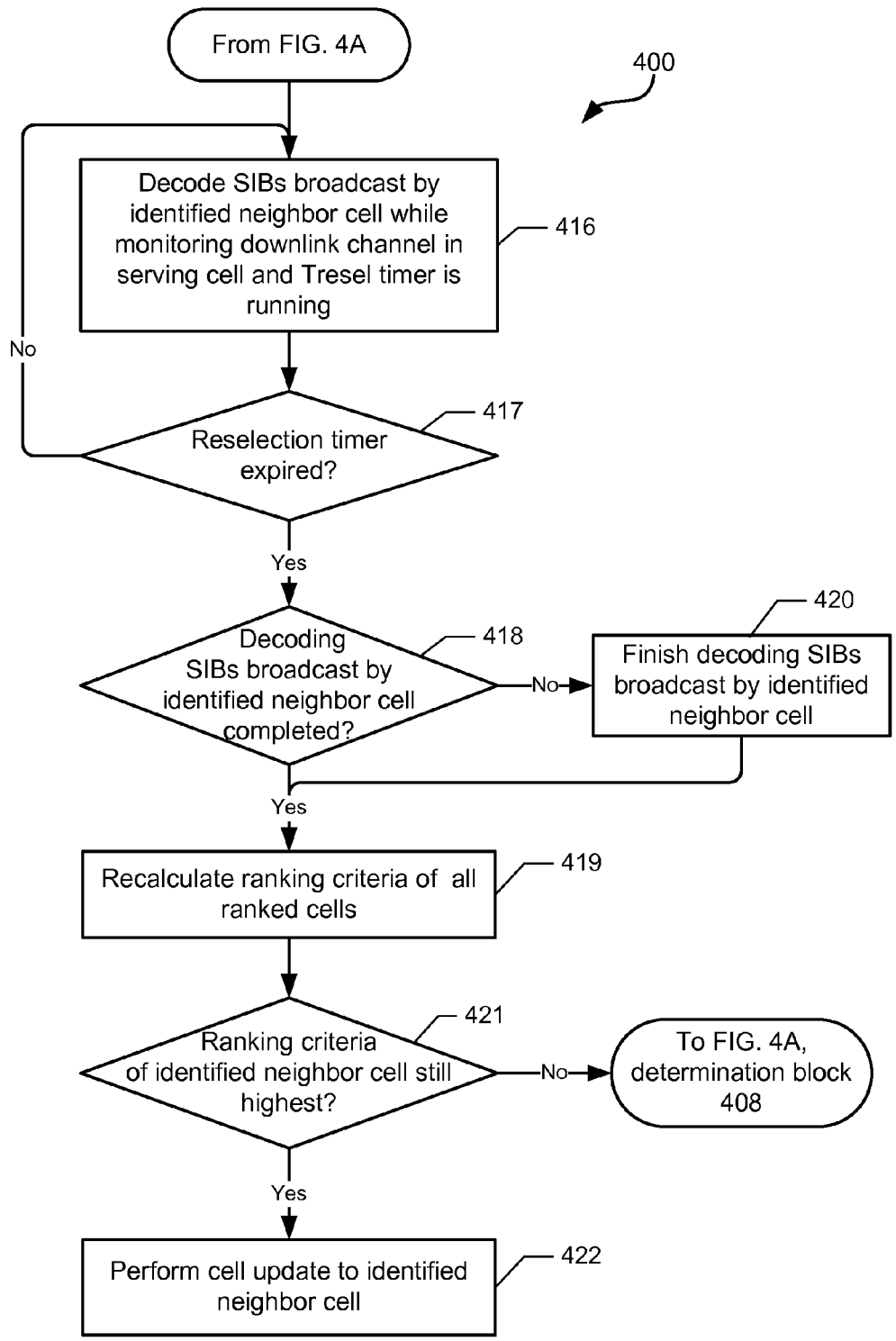

FIGS. 4A and 4B illustrate a method 400 for improving efficiency of intra-frequency reselection on a single-SIM or multi-SIM wireless device (e.g., 102, 200 in FIGS. 1-2) that is operating in a connected mode (e.g., CELL_FACH) according to some embodiments. In various embodiments, the operations of the method 400 may be implemented by one or more processors of the wireless device, such as the general purpose processor 206 in FIG. 2 and/or baseband modem processor(s) 216, or a separate controller (not shown) that may be coupled to memory (e.g., 214) and to the baseband modem processor(s) 216.

With reference to FIGS. 1-4B, in block 402, the wireless device processor may detect that a modem stack associated with a SIM is currently operating in a RRC connected mode. The wireless device (e.g., 102 in FIG. 1, 200 in FIG. 2) may have a layered software architecture to communicate with the first and second networks. The software architecture may be distributed among one or more baseband modem processor(s) 216, which may be part of and/or connected to the RF communication resources 218. In various embodiments, such a layered software architecture may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack.

In determination block 404, the wireless device processor may determine whether the detected modem stack is in an RRC state that continuously uses an RF resource (e.g., RF resource 218) to monitor a downlink channel (e.g., in CELL_FACH state). In response to determining that the detected modem stack is not in an RRC state that continuously uses an RF resource to monitor a downlink channel (e.g., determination block 404="No"), the wireless device processor may proceed with signal measurements of the serving and neighbor cells according to normal connected mode procedures in block 406.

In response to determining that the detected modem stack is in an RRC state that continuously uses a RF resource to monitor a downlink channel (e.g., determination block 404="Yes"), the wireless device processor may determine whether the ranking criteria of any qualified neighbor cell (i.e., a neighbor cell that satisfies the selection criteria discussed above) is the highest of all of the ranked cells (i.e., highest among the ranking criteria of the serving cell and all qualified neighbor cells) in determination block 408. In response to determining that no qualified neighbor cell has a ranking criteria that is the highest of all of the ranked cells (i.e., determination block 408="No"), the wireless device processor may remain camped on the serving cell in block 409. Until the ranking criteria of a qualified neighbor cell ranking becomes the highest (i.e., so long as determination block 408="No"), the wireless device processor may continue to perform measurements for ranking the serving cell and the qualified neighbor cells while camped on the serving cell.

In response to determining that the ranking criteria of a qualified neighbor cell is the highest of all of the ranked cells (i.e., determination block 408="Yes"), the wireless device processor may start a non-zero reselection timer for a duration of Treselection in block 410. In various embodiments, the Treselection value may be read from system information (e.g., SIB3 and/or SIB4) of the serving cell. In determination block 412, the wireless device processor may determine whether the qualified neighbor cell that is identified as having the highest ranking criteria is an intra-frequency cell. Such information may be obtained, for example, from information associated with the neighbor cell list that may be broadcast on SIB11 or SIB12 by the serving cell. In response to determining that the identified neighbor cell is not an intra-frequency cell (i.e., determination block 412="No"), the wireless device processor may perform cell reselection according to the normal procedure and timeline in block 414.

In response to determining that the identified neighbor cell is an intra-frequency cell (i.e., determination block 412="Yes"), the wireless device processor may decode system information for the identified neighbor cell by reading the SIBs that are broadcast by the identified neighbor cell, while simultaneously monitoring the downlink channel in the serving cell and while the Treseletion timer is running in block 416.

In determination block 417, the wireless device processor may determine whether the reselection timer has expired. Until the reselection timer expires (i.e., so long as determination block 417="No"), the wireless device processor may continue to decode the SIBs broadcast by the identified neighbor cell in block 416.

Depending on the configurations of the particular RRC state and/or network, the wireless device may be configured to periodically update ranking criteria for the serving cell and the qualified neighbor cells prior to expiration of the reselection timer. For example, in the CELL_FACH state, the identity of the highest ranking cell may be reestablished every 90 ms, while the Treselection time may be around 1 second. In various embodiments, the wireless device processor may ignore any change in which the serving cell becomes the highest ranking cell prior to the expiration of the reselection timer. In this manner, the wireless device processor may continue to read the SIBs broadcast by the identified neighbor cell, thereby avoiding frequent decoding of system information in ping pong scenarios.

In response to determining that the reselection timer has expired (i.e., determination block 417="Yes"), the wireless device processor may determine whether decoding the SIBs broadcast by the identified neighbor cell is completed in determination block 418. In some examples, the time to read the SIBs broadcast by the identified neighbor cell may be shorter than the Treselection time, while in other examples the time to read the SIBs broadcast by the identified neighbor cell may be longer than the Treselection time. In response to determining that decoding the SIBs broadcast by the identified neighbor cell is completed (i.e., determination block 418="Yes"), the wireless device processor may update (i.e., recalculate) the ranking criteria for the serving cell and the qualified neighbor cells in block 419. In response to determining that decoding of the SIBs broadcast by the identified neighbor cell is not completed (i.e., determination block 418="No"), the wireless device processor may finish decoding the SIBs broadcast by the identified neighbor cell in block 420, and the wireless device processor may update (i.e., recalculate) the ranking criteria for the serving cell and the qualified neighbor cells in block 419.

In determination block 421, the wireless device processor may determine whether the ranking criteria of the identified neighbor cell still has the highest value among all of the ranked cells. In response to determining that the ranking criteria of the identified neighbor cell is no longer the highest among all of the ranked cells (i.e., determination block 420="No"), the wireless device processor may again determine whether the ranking criteria of any qualified neighbor cell is the highest of all of the all ranked cells in determination block 408 as described (FIG. 4A).

In response to determining that the ranking criteria of the identified neighbor cell is still the highest among all of the ranked cells (i.e., determination block 420="Yes"), the wireless device processor may reselect to the identified neighbor cell in block 422 by performing a cell update procedure.

As used in this application, the terms "component," "module," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

References to a first subscription and a second subscription herein are arbitrary and for the purposes of clarifying descriptions of the various embodiments, and may apply to either or any SIM of the wireless device. Further, such designations of subscriptions/SIMs may be switched or reversed between instances of executing the methods of the various embodiments.

Figure 5:
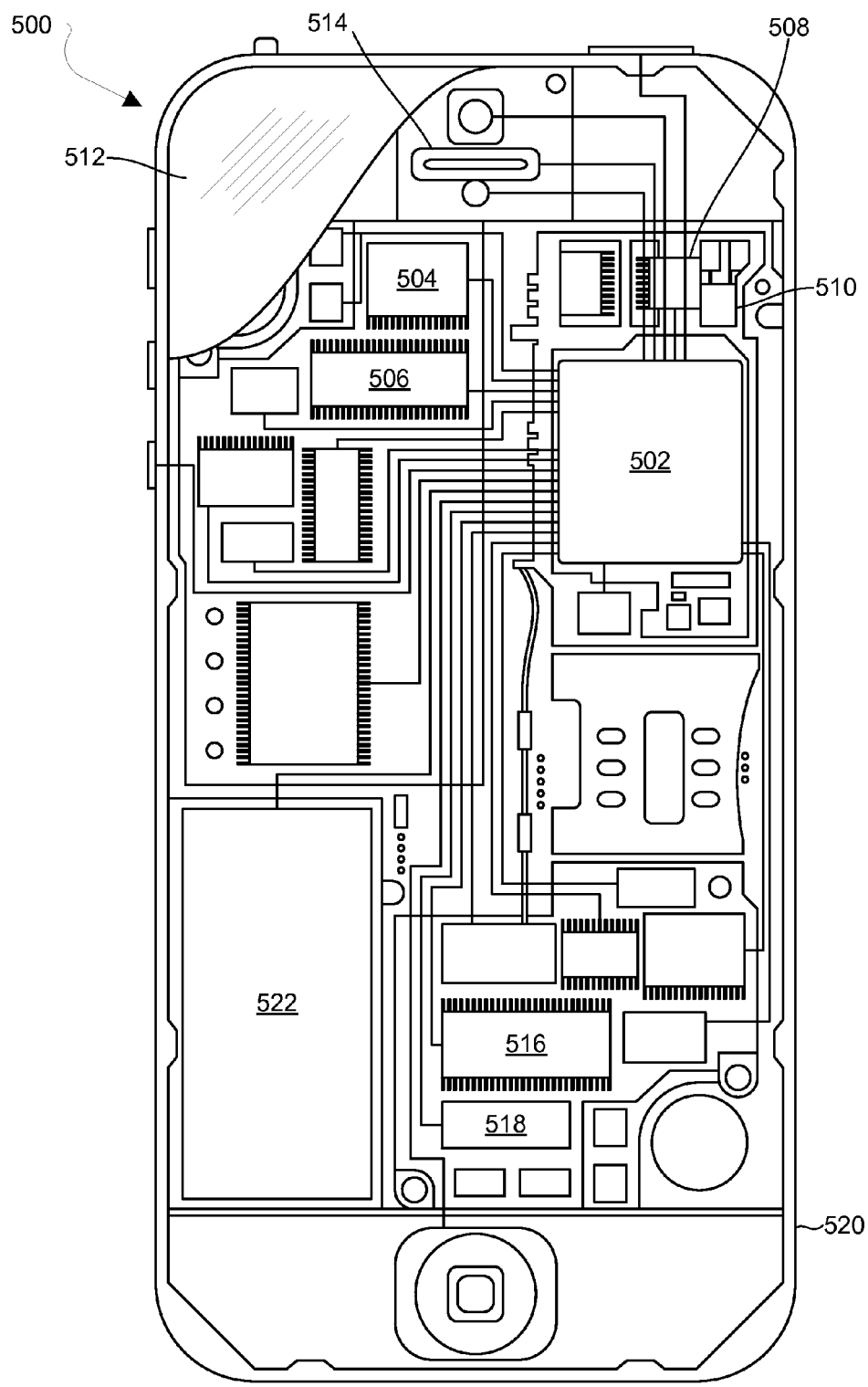
FIG. 5 is a component diagram of an example wireless communication device suitable for use with various embodiments.

Various embodiments may be implemented in any of a variety of wireless devices, an example of which is illustrated in FIG. 5. For example, the wireless device 500 (which may correspond, for example, the wireless devices 102, 200 in FIGS. 1-2) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless device 500 may include a cellular network wireless modem chip 516 that enables communication via a cellular network and is coupled to the processor. The wireless device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless device 500 may also include speakers 514 for providing audio outputs. The wireless device 500 may also include a housing 520, constructed of a plastic, metal, or a combination of materials, for containing all or some of the components discussed herein. The wireless device 500 may include a power source 522 coupled to the processor 502, such as a disposable or rechargeable battery. The rechargeable battery may also be coupled to the peripheral device connection port to receive a charging current from a source external to the wireless device 500.

Figure 6:
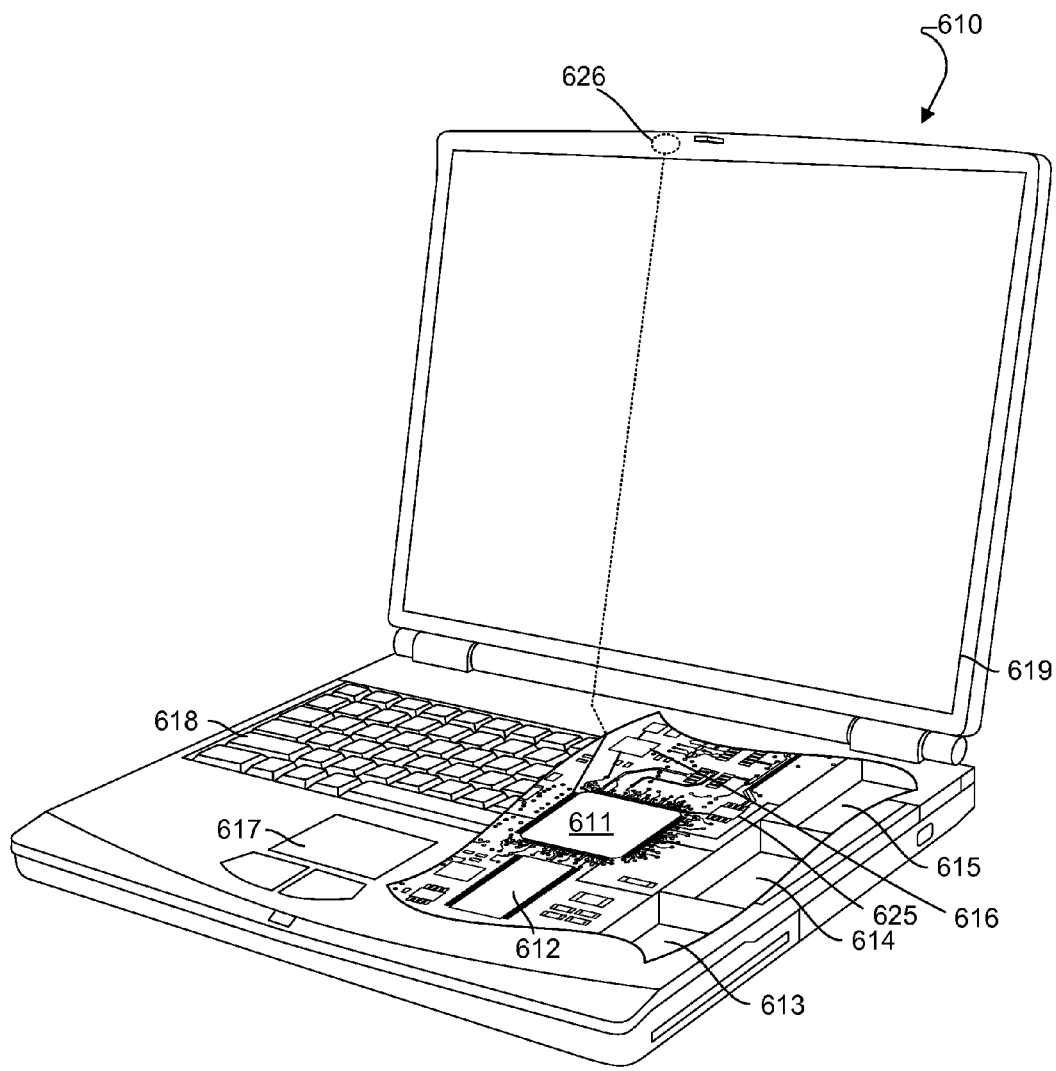
FIG. 6 is a component diagram of another example wireless communication device suitable for use with various embodiments.

Various embodiments described above may also be implemented within a variety of personal computing devices, such as a laptop computer 600 (which may correspond, for example, the wireless devices 102, 200 in FIGS. 1-2) as illustrated in FIG. 6. Many laptop computers include a touchpad touch surface 617 that serves as the computer's pointing device, and thus may receive drag, scroll, and flick gestures similar to those implemented on wireless computing devices equipped with a touch screen display and described above. The laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad touch surface 617, the keyboard 618, and the display 619 all coupled to the processor 611. Other configurations of the computing device may include a computer mouse or trackball coupled to the processor (e.g., via a USB input) as are well known, which may also be use in conjunction with various embodiments.

The processors 502 and 611 may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of improving cell reselection on a wireless communication device having at least a first subscriber identity module (SIM) associated with a radio frequency (RF) resource and a first modem stack operating in a radio resource control (RRC) connected mode, the method comprising:

detecting that the first modem stack is camped on a serving cell of a first network;
receiving a list of neighbor cells from system information broadcast in the serving cell;
performing signal measurements associated with listed neighbor cells and the serving cell;
identifying neighbor cells that satisfy selection criteria based on the signal measurements;
calculating ranking criteria for the serving cell and for the identified neighbor cells;
determining whether the calculated ranking criteria for an intra-frequency neighbor cell is a highest value among the calculated ranking criteria for the identified neighbor cells and the serving cell; and
in response to determining that the calculated ranking criteria for an intra-frequency neighbor cell is a highest value among the calculated ranking criteria for the identified neighbor cells and the serving cell, starting a non-zero reselection timer and decoding system information broadcast by the intra-frequency neighbor cell, wherein the non-zero reselection timer runs concurrently with decoding the system information.

2. The method of claim 1, further comprising:
determining whether the reselection timer has expired;
determining whether decoding the system information broadcast by the intra-frequency neighbor cell is completed in response to determining that the reselection timer has expired; and
finishing decoding the system information broadcast by the intra-frequency neighbor cell in response to determining that decoding the system information broadcast by the intra-frequency neighbor cell is not completed.

3. The method of claim 2, further comprising:
continuing decoding the system information broadcast by the intra-frequency neighbor cell in response to determining that the reselection timer has not expired.

4. The method of claim 2, further comprising:
recalculating ranking criteria for the serving cell and for the identified neighbor cells in response to determining that the reselection timer has expired; and
determining whether the recalculated ranking criteria for the intra-frequency neighbor cell has a highest value among the identified neighbor cells and the serving cell.

5. The method of claim 4, further comprising:
completing reselection to the intra-frequency neighbor cell in response to determining that the recalculated ranking criteria for the intra-frequency neighbor cell has a highest value among the identified neighbor cells and the serving cell, wherein completing reselection comprises performing a cell update procedure.

6. The method of claim 5, wherein the wireless communication device also includes a second SIM associated with the RF resource and with a second modem stack, wherein the second modem stack is provided use of the RF resource following the cell update procedure on the first modem stack.

7. The method of claim 1, further comprising:
determining whether the first modem stack is in an RRC state in which the RF resource is being used to monitor a downlink channel of the serving cell, wherein decoding the system information broadcast by the intra-frequency neighbor cell is performed concurrently with monitoring the downlink channel of the serving cell.

8. The method of claim 7, wherein determining whether the first modem stack is in an RRC state in which the RF resource is being used to monitor a downlink channel of the serving cell comprises determining whether the first modem stack is in a CELL_FACH state.

9. The method of claim 1, wherein calculating ranking criteria for the serving cell and for the identified neighbor cells is performed based on at least one of signal strength measurements and signal quality measurements.

10. The method of claim 1, wherein the non-zero reselection timer has a duration equal to a non-zero Treselection value that is received in system information broadcast on the serving cell.

11. The method of claim 10, wherein the Treselection value is greater than 500 milliseconds.

12. A wireless communication device, comprising:
a radio frequency (RF) resource configured to connect to at least a first subscriber identity module (SIM);
a processor coupled to the RF resource and configured with processor-executable instructions to:
detect when a first modem stack configured to operate in a radio resource control (RRC) connected mode is camped on a serving cell of a first network;
receive a list of neighbor cells from system information broadcast in the serving cell;
perform signal measurements associated with the listed neighbor cells and the serving cell;
identify neighbor cells that satisfy selection criteria based on the signal measurements;
calculate ranking criteria for the serving cell and for the identified neighbor cells;
determine whether the calculated ranking criteria for an intra-frequency neighbor cell is a highest value among the calculated ranking criteria for the identified neighbor cells and the serving cell; and
in response to determining that the calculated ranking criteria for an intra-frequency neighbor cell is a highest value among the calculated ranking criteria for the identified neighbor cells and the serving cell, start a non-zero reselection timer and decode system information broadcast by the intra-frequency neighbor cell, wherein the non-zero reselection timer runs concurrently with decoding the system information.

13. The wireless communication device of claim 12, wherein the processor is further configured with processor-executable instructions to:
determine whether the reselection timer has expired;
determine whether decoding the system information broadcast by the intra-frequency neighbor cell is completed in response to determining that the reselection timer has expired; and
finish decoding the system information broadcast by the intra-frequency neighbor cell in response to determining that decoding the system information broadcast by the intra-frequency neighbor cell is not completed.

14. The wireless communication device of claim 13, wherein the processor is further configured with processor-executable instructions to:
continue decoding the system information broadcast by the intra-frequency neighbor cell in response to determining that the reselection timer has not expired.

15. The wireless communication device of claim 13, wherein the processor is further configured with processor-executable instructions to:
recalculate ranking criteria for the serving cell and for the identified neighbor cells in response to determining that the reselection timer has expired; and determine whether the recalculated ranking criteria for the intra-frequency neighbor cell has a highest value among the identified neighbor cells and the serving cell.

16. The wireless communication device of claim 15, wherein the processor is further configured with processor-executable instructions to:
complete reselection to the intra-frequency neighbor cell in response to determining that the recalculated ranking criteria for the intra-frequency neighbor cell has a highest value among the identified neighbor cells and the serving cell, wherein completing reselection comprises performing a cell update procedure.

17. The wireless communication device of claim 16, further comprising a second modem stack, wherein the wireless communication device also includes a second SIM associated with the RF resource is configured to couple with a second SIM, wherein the processor is configured with processor-executable instructions to provide the second modem stack with use of the RF resource following the cell update procedure on the first modem stack.

18. The wireless communication device of claim 12, wherein the processor is further configured with processor-executable instructions to:
determine whether the first modem stack is in an RRC state in which the RF resource is being used to monitor a downlink channel of the serving cell, wherein decoding the system information broadcast by the intra-frequency neighbor cell is performed concurrently with monitoring the downlink channel of the serving cell.

19. The wireless communication device of claim 18, wherein the processor is further configured with processor-executable instructions to determine whether the first modem stack is in an RRC state in which the RF resource is being used to monitor a downlink channel of the serving cell by determining whether the first modem stack is in a CELL_FACH state.

20. The wireless communication device of claim 12, wherein the processor is further configured with processor-executable instructions to calculate ranking criteria for the serving cell and for the identified neighbor cells based on at least one of signal strength measurements and signal quality measurements.

21. The wireless communication device of claim 12, wherein the non-zero reselection timer has a duration equal to a non-zero Treselection value that is received in system information broadcast on the serving cell.

22. The wireless communication device of claim 21, wherein the Treselection value is greater than 500 milliseconds.

23. A wireless communication device, comprising:
a radio frequency (RF) resource configured to connect to at least a first subscriber identity module (SIM);
means for detecting when a first modem stack configured to operate in a radio resource control (RRC) connected mode is camped on a serving cell of a first network;
means for receiving a list of neighbor cells from system information broadcast in the serving cell;
means for performing signal measurements associated with listed neighbor cells and the serving cell;
means for identifying neighbor cells that satisfy selection criteria based on the signal measurements;
means for calculating ranking criteria for the serving cell and for the identified neighbor cells;
means for determining whether the calculated ranking criteria for an intra-frequency neighbor cell is a highest value among the calculated ranking criteria for the identified neighbor cells and the serving cell; and
means for starting a non-zero reselection timer and decoding system information broadcast by the intra-frequency neighbor cell in response to determining that the calculated ranking criteria for an intra-frequency neighbor cell is a highest value among the calculated ranking criteria for the identified neighbor cells and the serving cell, wherein the non-zero reselection timer runs concurrently with decoding the system information.

24. A non-transitory processor-readable storage medium having stored thereon processor-executable instructions configured to cause a processor of a wireless communication device having a first SIM associated with a first radio frequency (RF) resource to perform operations comprising:
detecting that a first modem stack configured to operate in a radio resource control (RRC) connected mode is camped on a serving cell of a first network;
receiving a list of neighbor cells from system information broadcast in the serving cell;
performing signal measurements associated with listed neighbor cells and the serving cell;
identifying neighbor cells that satisfy selection criteria based on the signal measurements;
calculating ranking criteria for the serving cell and for the identified neighbor cells;
determining whether the calculated ranking criteria for an intra-frequency neighbor cell is a highest value among the calculated ranking criteria for the identified neighbor cells and the serving cell; and
in response to determining that the calculated ranking criteria for an intra-frequency neighbor cell is a highest value among the calculated ranking criteria for the identified neighbor cells and the serving cell, starting a non-zero reselection timer and decoding system information broadcast by the intra-frequency neighbor, wherein the non-zero reselection timer runs concurrently with decoding the system information.

25. The non-transitory processor-readable storage medium of claim 24, wherein the stored processor-executable instructions are configured to cause the processor of the wireless communication to perform operations further comprising:
determining whether the reselection timer has expired;
determining whether decoding the system information broadcast by the intra-frequency neighbor cell is completed in response to determining that the reselection timer has expired; and
finishing decoding the system information broadcast by the intra-frequency neighbor cell in response to determining that decoding the system information broadcast by the intra-frequency neighbor cell is not completed.

26. The non-transitory processor-readable storage medium of claim 25, wherein the stored processor-executable instructions are configured to cause the processor of the wireless communication to perform operations further comprising:
continuing decoding the system information broadcast by the intra-frequency neighbor cell in response to determining that the reselection timer has not expired.

27. The non-transitory processor-readable storage medium of claim 25, wherein the stored processor-executable instructions are configured to cause the processor of the wireless communication to perform operations further comprising:

recalculating ranking criteria for the serving cell and for the identified neighbor cells in response to determining that the reselection timer has expired; and determining whether the recalculated ranking criteria for the intra-frequency neighbor cell has a highest value among the identified neighbor cells and the serving cell.

28. The non-transitory processor-readable storage medium of claim 27, wherein the stored processor-executable instructions are configured to cause the processor of the wireless communication to perform operations further comprising:

completing reselection to the intra-frequency neighbor cell in response to determining that the recalculated ranking criteria for the intra-frequency neighbor cell has a highest value among the identified neighbor cells and the serving cell.

\* \* \* \* \*